US008641342B2

(12) United States Patent
Drexler et al.

(10) Patent No.: US 8,641,342 B2
(45) Date of Patent: Feb. 4, 2014

(54) STUD FOR STUD WELDING

(75) Inventors: Frank Drexler, Ortenberg (DE);
Joachim Schneider, Ehringshausen (DE); Hans-Gerhard Kortmann, Vechelde (DE)

(73) Assignee: Newfrey LLC, Newark, DE (US)

( * ) Notice: Subject to any disclaimer, the term of this patent is extended or adjusted under 35 U.S.C. 154(b) by 108 days.

(21) Appl. No.: 12/986,747

(22) Filed: Jan. 7, 2011

(65) Prior Publication Data

US 2011/0142566 A1    Jun. 16, 2011

Related U.S. Application Data

(63) Continuation of application No. PCT/US2009/050047, filed on Jul. 9, 2009.

(30) Foreign Application Priority Data

Jul. 9, 2008 (DE) .......................... 10 2008 033 373

(51) Int. Cl.
*F16B 37/06* (2006.01)
(52) U.S. Cl.
CPC ..................................... *F16B 37/06* (2013.01)
USPC ......................................................... 411/171
(58) Field of Classification Search
USPC ..................... 411/171, 402; 219/99
See application file for complete search history.

(56) References Cited

U.S. PATENT DOCUMENTS

| 2,054,245 | A | * | 9/1936 | Cummins | 219/104 |
| 3,481,634 | A | * | 12/1969 | Rondeau | 403/12 |
| 3,597,573 | A | | 8/1971 | Ettinger | |
| 3,671,710 | A | | 6/1972 | Coombs | |
| 3,888,144 | A | * | 6/1975 | Parsons | 81/436 |
| 4,194,806 | A | * | 3/1980 | Macemon | 439/801 |
| 5,207,588 | A | | 5/1993 | Ladouceur et al. | |
| 5,618,491 | A | * | 4/1997 | Kurup et al. | 420/77 |
| 6,818,851 | B2 | * | 11/2004 | Ramasamy et al. | 219/98 |
| 7,654,782 | B2 | * | 2/2010 | Nilsen et al. | 411/171 |
| 7,695,227 | B2 | * | 4/2010 | Stevenson et al. | 411/171 |
| 2008/0067217 | A1 | | 3/2008 | Pinzl et al. | |

FOREIGN PATENT DOCUMENTS

| DE | 19611711 A | 10/1997 |
| DE | 102004054675 A | 5/2006 |
| JP | 6066872 U1 | 9/1994 |
| JP | 2005233268 A | 9/2005 |
| WO | 9533400 A | 12/1995 |
| WO | 02056422 A | 7/2002 |
| WO | 2004033923 A | 4/2004 |

* cited by examiner

*Primary Examiner* — Flemming Saether
(74) *Attorney, Agent, or Firm* — Michael P. L. Leary

(57) ABSTRACT

A welding stud includes a shank and a head flange, which projects radially relative to the shank and whose outer circumference is of polygonal design in order to be able to apply a test torque (T) to the stud by means of a tool. The flange includes an annular section (16) whose front facing and radially extending annular surface is designed as a welding surface. The annular section directly adjoins the flange, and the annular section and the flange form a head section which has a uniform outside diameter (D) throughout, and wherein the polygonal shape of the flange extends over the annular section up to its front annular surface.

18 Claims, 1 Drawing Sheet

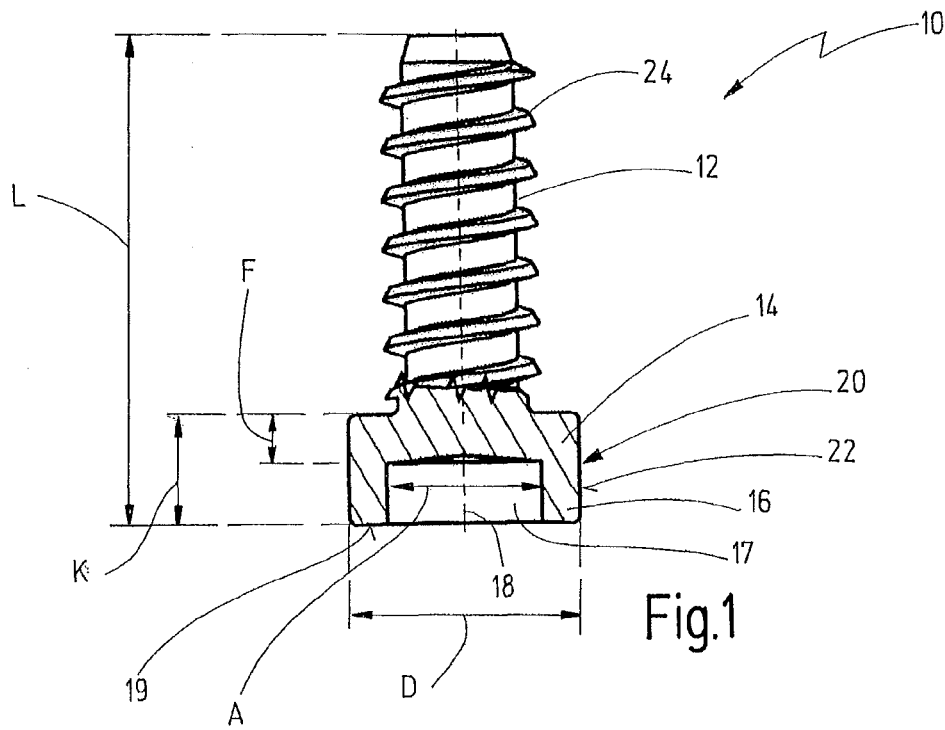
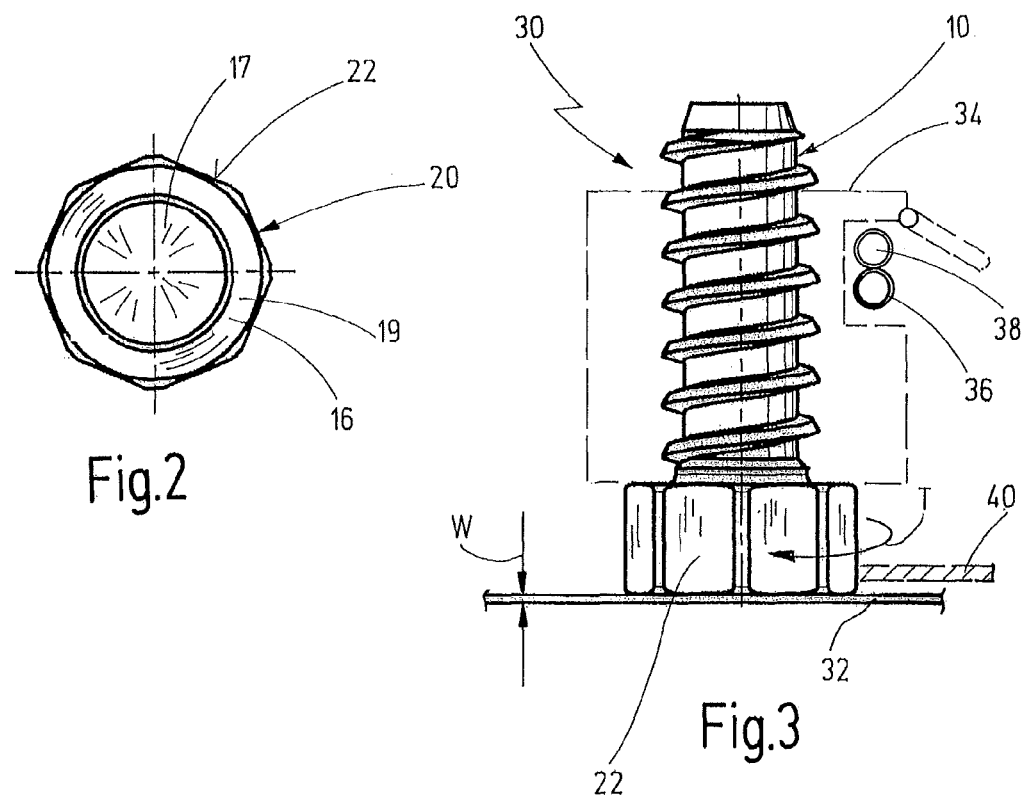

STUD FOR STUD WELDING

CROSS REFERENCE TO RELATED APPLICATIONS

This application is a continuation of PCT Application No. PCT/US2009/050047, filed Jul. 9, 2009 which claims the benefit of German Application No. 10 2008 033 373.5, filed on Jul. 9, 2008, the disclosure of which is incorporated herein by reference.

BACKGROUND OF THE INVENTION

The present invention relates to a stud for stud welding, having a shank, having an axially adjoining flange which projects radially relative to the shank, and having an annular section which axially adjoins the flange and whose front, radially extending annular surface is designed as a welding surface which is to be welded to a workpiece.

The invention also relates to a fastening arrangement having a workpiece and a stud welded to the workpiece and also relates to a method of welding a stud to a workpiece and to the use of such a stud for welding onto a workpiece.

The invention generally concerns the field of stud welding. This welding process is used, inter alia, to a great extent in the field of vehicle technology. In this case, studs are welded to body sheets and serve as anchors for plastic fastening elements (clips), dashboards, etc.

The trend in recent years is to reduce the thickness of the body sheets in order to reduce, for example, the weight of the vehicle. The welding of studs onto body sheets that are becoming increasingly thinner turns out to be difficult. As a rule, the studs have a conically tapering welding surface. In order to fuse this surface during the stud welding, a relatively high input of energy is required. This may lead to "burn-through" of the body sheet.

Consequently, a welding stud which has a concave recess and is designed for capacitor discharge welding has been proposed in document U.S. Pat. No. 3,671,710. In this case, the recess together with the outside diameter of the stud results in an annular flange. This is intended to improve the uniformity of the molten pool.

Document DE 196 11 711 A1 discloses a welding element having an annular flange structure. The annular flange has a margin narrowing in cross section, such that an approximately linear edge is obtained at the front end of the stud. The welding edge is set down on the workpiece. The stud is then pulled back for forming an arc. Finally, the stud is pushed into the complete molten pool. An approximately annular welding spot results overall, and a cavity is formed between the stud and the workpiece in the interior of this annular welding spot. It is mentioned that the configuration of the stud is intended to permit welding of the stud to relatively thin sheets by means of the drawn-arc process.

Finally, document WO 2004/033923 A1 discloses a fastening element in which a stud is welded onto a sheet (in particular a sandwich sheet). The stud has a region which serves as a predetermined breaking point in order to achieve a defined failure case. A nut is screwed onto the stud, and the strength of the stud is adapted to the strength of the nut, such that the nut breaks first before the stud breaks. Provided the nut does not break, the stud breaks before the stud is torn out of the sheet.

In other words, a torque is not applied to the stud until during the assembly when a plastic fastening element or the like is actually put onto the stud. If a defect affecting the stud and/or the sheet occurs at this moment for certain reasons, relatively expensive rework is necessary. For at this moment the sheet is already painted as a rule and the repair of the welding spot and the re-application of a stud consequently require complicated subsequent treatment of the surface of the body sheet.

The stud used has a shank, a flange section and an axially adjoining annular section which together form a head section. The ratio of axial length of the annular section to axial length of the head section (which is formed by the flange and the annular section) is to be less than 50%, in particular within the range of 25% to 35%. Considerable importance is also attached to other dimensions or ratios of dimensions of the head section in this application. The outside diameter of the head section is designed to be round in this case.

Against the above background, an object of the invention is to specify a cost-effective stud, an improved fastening arrangement and an improved method of welding a stud onto a workpiece, wherein the workpiece has a small thickness and wherein a situation in which expensive rework has to be carried out in the assembly area in the event of failure of a welded joint can be avoided.

BRIEF SUMMARY OF THE INVENTION

This object is firstly achieved by a stud for stud welding, having a shank, having an axially adjoining flange which projects radially relative to the shank and whose outer circumference is of polygonal design in order to be able to apply a test torque to the stud by means of a tool, and having an annular section which axially adjoins the flange and whose front, radially extending annular surface is designed as a welding surface which is to be welded to a workpiece, wherein the annular section directly adjoins the flange, and the annular section and the flange form a head section which has a uniform outside diameter throughout, and wherein the polygonal shape of the flange extends over the annular section up to its front annular surface.

The above object is also achieved by a fastening arrangement having a workpiece and a stud of the type according to the invention welded to the workpiece, wherein the workpiece has a thickness of less than 1 mm, in particular less than 0.8 mm.

The above object is also achieved by a method of welding a stud to a workpiece and of checking the strength of the welded joint, comprising the steps:

providing a stud of the type according to the invention;

welding the stud onto the workpiece, in particular by drawn-arc stud welding; and attaching a tool to the head section of the stud and applying a predetermined torque to the stud in order to check the strength of the welded joint.

Finally, the above object is achieved by the use of a stud according to the invention for welding onto a workpiece, the thickness of which is less than 1 mm, in particular less than 0.8 mm.

The stud according to the invention is suitable in particular for welding onto very thin workpieces, such as thin body sheets. There has been a trend in recent years for sheets of less than 1 mm, in particular less than 0.8 mm or even 0.6 mm and smaller. Due to the design of the annular section and of a welding surface formed as an annular surface, welding can be carried out in this case with a relatively small input of energy, such that the risk of burn-through of the sheet is reduced. Due to the design of the polygonal shape at the outside diameter of the head section, it is possible to check the strength of the welded joint. This is preferably done during the body-in-white phase, that is to say, for example, immediately after the stud has been welded onto the workpiece. Consequently, any possible defective welded joint can be repaired in good time. Expensive rework, as would be necessary in the event of a repair during the assembly phase, is not necessary. Furthermore, it has surprisingly been found that, despite the polygonal shape throughout (which extends over the annular section up to front annular surface), essentially no disadvantages arise during the forming of the arc. Furthermore, the stud can be produced cost-effectively on account of the polygonal shape throughout at the head section.

The object is therefore completely achieved.

It is especially preferred if the stud is made in one piece of metal, in particular steel.

However, the stud can generally also be made of another metal, such as aluminum for example.

Furthermore, it is advantageous if the stud is produced by a cold forming process, in particular in a one-stage process with relatively little forming. This makes it possible for the shape of the stud to be of relatively simple design and for the polygonal shape to extend over the entire outer circumference of the head section. In the case of large-flange studs, a multi-stage forming process may also be used. Even in the case of a multi-stage process, the polygonal shape can be produced by forming. This may be done, for example, by the larger flange being upset and deburred. The final shape is then formed in an additional press stage using a press tool.

The shank may be of cylindrical design but preferably has a thread. The thread may be a metric thread but is in particular a coarse thread.

The polygonal shape is preferably an octagonal shape.

In this embodiment, the stud can be produced cost-effectively. Furthermore, a comparatively simple tool can be used in order to exert a test torque on the already welded-on stud. However, the polygonal shape may also be a hexagonal shape or another polygonal shape. Furthermore, the expression "polygonal shape" in this case is also intended to refer to the fact that the outer circumference is toothed or has another shape differing from a circular shape.

It is especially preferred if the ratio of the axial length of the head section to the outside diameter of the head section is within the range of 1/7 to 3/4, in particular within the range of 1/3 to 3/4 in the case of standard studs or 1/6 to 1/2 the case of large-flange studs.

In this way, the axial length of the head section can be designed to be relatively large, such that it is comparatively simple to attach a tool for exerting a test torque.

According to a further preferred embodiment, the ratio of the axial length of the flange to the axial length of the head section is within the range of 3/10 to 5/10.

In this way, the annular section can be designed to be relatively long in relation to the flange. Therefore firstly weight can be saved. Secondly the head section overall can have a comparatively small axial length, such that a low overall height is obtained.

This applies in particular if the ratio of the axial length of the flange to the axial length of the head section is less than 5/10.

In the case of large-flange studs, the ratio of the axial length of the flange to the axial length of the head section is as a rule markedly below 5/10.

In the case of studs having a large flange diameter, it is advantageous to provide a locating point for automatic feeding into welding installations and for the assembly (screwing on or mounting attachments). Said locating point is provided on the shank end face opposite the head section and has a smaller diameter than the shank.

Furthermore, large-flange studs can also be provided pre-completed with plastic parts (plastic nuts, plastic components, etc.) or metal parts (cap nuts, flange nuts for ground studs or metal components) and be welded automatically or manually.

It goes without saying that the abovementioned features and the features still to be explained below can be used not only in the respectively specified combination but rather also in other combinations or on their own without departing from the scope of the present invention.

BRIEF DESCRIPTION OF THE SEVERAL VIEWS OF THE DRAWINGS

Exemplary embodiments of the invention are shown in the drawing and described in more detail below. In the drawing:

FIG. 1 shows a partly sectioned side view of a stud according to an embodiment of the invention;

FIG. 2 shows a view of the stud of FIG. 1 from the front; and

FIG. 3 shows a fastening arrangement with a workpiece and a stud according to FIGS. 1 and 2 welded onto the workpiece.

DETAILED DESCRIPTION OF THE PREFERRED EMBODIMENTS OF THE INVENTION

An embodiment of a stud according to the invention is designated generally by 10 in FIGS. 1 and 2.

The stud 10 has a shank 12, adjoining which in the axial direction is a flange 14. Adjoining the flange 14 in the axial direction is an annular section 16, within which a recess 17 of circular cross section is located.

A longitudinal axis of the stud 10 is shown at 18.

A front annular surface 19 is formed on the front end of the annular section 16. The recess 17 extends from the front annular surface 19 up to the flange 14.

On the whole, the flange 14 and the annular section 16 form a head section 20, the outer circumference of which has a polygonal shape 22, in the present case an octagonal shape.

A coarse thread 24 is formed on the shank 12. The stud 10 has an overall length L. The axial length of the head section 20 is designated by K in FIG. 1. The axial length of the flange section is designated by F in FIG. 1. An outside diameter of the head section 20 is designated by D, and an inside diameter of the recess 17 is designated by A.

The ratio of the axial length F of the flange 14 to the axial length K of the head section 20 is within the range of 3/10 to 5/10, in the present case approximately within the range of 4.5/10.

The ratio of the inside diameter A of the recess 17 to the outside diameter D of the head section 20 is within the range of 5/10 to 8/10, preferably within the range of 6/10 to 7/10.

The ratio of the axial length K of the head section 20 to the overall length L of the stud 10 is within the range of 1/10 to 4/10, preferably within the range of 1.5/10 to 3/10. In the present case the ratio is about 2/10.

The front annular surface 19 extends in the radial direction. The inner circumference of the annular section 16 is of circular design in cross section.

FIG. 3 shows a fastening arrangement 30 according to the invention, said fastening arrangement 30 having a stud 10 of the type shown in FIGS. 1 and 2, said stud 10 being welded onto a workpiece 32. The workpiece 32 is a metal sheet, preferably made of the same material as the stud 10 or of a material similar to that of the stud 10. The workpiece 32 has a thickness W which is less than 1.0 mm, in particular less than 0.8 mm. In the present case the thickness W is about 0.6 mm.

As indicated schematically in FIG. 3, the stud 10 is suitable for fixing a plastic fastening element or clip 34, as is known per se in the prior art. The clip 34 may contain, for example, a receptacle 36 for a component 38. The component 38 may be, for example, a cable or a cable harness, a brake line or a fuel line.

In this case, the clip 34 bears on that side of the flange 14 which points toward the shank 12, as shown in FIG. 3.

In the field of vehicle technology, the clip 34 is fastened to the stud 10 as a rule in an "assembly area". In this case, the body shell of the vehicle is produced and the workpiece 32 including the stud 10 is as a rule already painted, such that the requisite attachments can be carried out. The stud 10 is welded onto the workpiece 32 beforehand in a "body-in-white phase".

Directly after the body-in-white phase and before further processing steps, it is preferably checked whether the welded joint between the stud 10 and the workpiece 32 has sufficient strength.

In this case, during the body-in-white phase or before the assembly phase, a torque T is exerted on the stud 10 about the longitudinal axis 18 by means of a tool 40 (indicated schematically in FIG. 3). In the process, the tool 40 acts on the head section 20 provided with the polygonal shape. The torque T that is applied in this case is a predetermined torque which a stud 10 correctly welded to the workpiece 32 can absorb without damaging the welded joint and/or the stud 10.

In addition, the polygonal shape of the head section 14 enables mounted components or plastic fastening elements (clips 34), given the provision of suitable receptacles, to be able to act on the polygonal shape 22 in order to permit anti-rotation locking or adjustment in the correct position.

The stud 10 can generally be used universally. It may be provided with or without a pre-completed plastic part (for example welding of the stud 10 to the workpiece, wherein the plastic fastening element is already pre-fitted on the stud 10, as is advantageous, for example, in underbody fastening).

In this embodiment, care should possibly be taken to ensure that the pre-fitted plastic fastening element leaves at least part of the polygonal shape 22 of the head section 20 free in order to still be able to exert the test torque in the body-in-white phase.

Furthermore, the stud 10 can also be welded onto a workpiece 32 without pre-fitted plastic part, as described above. A plastic fastening element such as a clip 34 can then be fastened thereto, for example in an assembly area.

The stud 10 is preferably welded on by arc welding with drawn arc. In the process, the annular surface 19 is set down on the workpiece 32. An electric pilot current is then switched on. The stud 10 is then lifted again from the workpiece 32, in the course of which an arc is struck. After that, if need be a cleaning current is switched on (not absolutely necessary). Finally, a welding current which is markedly higher than the pilot current is switched on, the energy being sufficient in order to fuse the front annular surface 19 and a corresponding mating surface on the workpiece 32. Finally, the stud 10 is lowered again onto the workpiece 32, in the course of which the molten pools fuse together. The welding current is then switched off. The complete molten pool solidifies, and the stud 10 is integrally connected to the workpiece 32.

Although exemplary embodiments of the present invention have been shown and described, it will be appreciated by those skilled in the art that changes may be made to these embodiments without departing from the principles and spirit of the invention, the scope of which is defined in the appended claims and their equivalents.

The invention claimed is:

1. A weld stud for stud welding, comprising:
   a shank,
   a flange axially adjoining the shank, the flange projects radially relative to the shank and defines a polygon shaped outer circumference;
   an annular section axially adjoining the flange and including an axially facing and radially extending annular weld surface; and
   the annular section and the flange comprise a head section of uniform outside diameter throughout, and the polygonal shape of the flange extends over the annular section up to its axially facing annular weld surface.

2. A weld stud according to claim 1, wherein the stud is made in one piece of metal.

3. A weld stud according to claim 1, wherein the stud is produced by a cold forming process.

4. A weld stud according to claim 1, wherein the shank has a thread.

5. A weld stud according to claim 1, wherein the polygonal shape is an octagonal shape.

6. A weld stud according to claim 1, wherein the head section defines an axial length and an outside diameter, and a ratio of the axial length of the head section to the outside diameter of the head section is within the range of 1/7 to 3/4.

7. A weld stud according to claim 6, wherein the flange defines a second axial length, and the ratio of the second axial length of the flange to the axial length of the head section is within the range of 3/10 to 5/10.

8. A weld stud according to claim 6, wherein the flange defines a second axial length, and the ratio of the second axial length of the flange to the axial length of the head section is less than 5/10.

9. A weldable assembly comprising:
   a workpiece defining a thickness of less than 1 mm, and
   a stud weldable to the workpiece and located at a distance from the workpiece suitable for forming an arc, and the stud includes:
   a shank,
   a flange axially adjoining the shank, the flange projects radially relative to the shank and defines a polygon shaped outer circumference;
   an annular section axially adjoining the flange and including an axially facing and radially extending annular weld surface; and
   the annular section and the flange comprise a head section of uniform outside diameter throughout, and the polygonal shape of the flange extends over the annular section up to its axially facing annular weld surface.

10. A weldable assembly according to claim 9, wherein the workpiece thickness is less than 0.8 mm.

11. A weldable assembly according to claim 9, wherein the stud is produced by a cold forming process.

12. A weldable assembly according to claim 9, wherein the shank has a thread.

13. A weldable assembly according to claim 9, wherein the polygonal shape is an octagonal shape.

14. A weldable assembly according to claim 9, wherein the head section defines an axial length and an outside diameter, and a ratio of the axial length of the head section to the outside diameter of the head section is within the range of 1/7 to 3/4.

15. A weldable assembly according to claim 14, wherein the flange defines a second axial length and the ratio of the second axial length of the flange to the axial length of the head section is within the range of 3/10 to 5/10.

16. A weldable stud for stud welding to a workpiece, the stud comprising: a shank; an axially adjoining flange which projects radially relative to the shank; and an annular section which axially adjoins the flange and whose axially facing and radially extending annular surface is designed as a welding surface which is weldable to the workpiece, wherein the annular section directly adjoins the flange, and the annular section and the flange form a head section which has an axially uniform outside diameter, and characterized in that the outer perimeter of the flange is of polygonal shape in order to be able to apply a test torque to the stud by means of a tool, and the polygonal shape of the flange extends over the annular section up to its front annular surface.

17. A weldable stud according to claim 16, wherein a ratio of an axial length of the head section to an outside diameter of the head section is within a range of 1/7 to 3/4.

18. A weldable stud according to claim 16, wherein a ratio of an axial length of the flange to an axial length of the head section is within a range of 3/10 to 5/10.

* * * * *